United States Patent Office 3,749,712
Patented July 31, 1973

3,749,712
TRIAMCINOLONE ACETONIDE ESTERS AND
PROCESS FOR THEIR PREPARATION
Claudio Cavazza, Giancarlo Eletti Bianchi, and Enrico Diamanti, Rome, Italy, assignors to Sigma-Tau Industrie Farmaceutiche Riunite S.p.A., Rome, Italy
No Drawing. Filed Sept. 25, 1970, Ser. No. 75,671
Int. Cl. C07c 173/00
U.S. Cl. 260—239.55 D          1 Claim

ABSTRACT OF THE DISCLOSURE

New triamcinolone acetonide esters of the general formula (I)

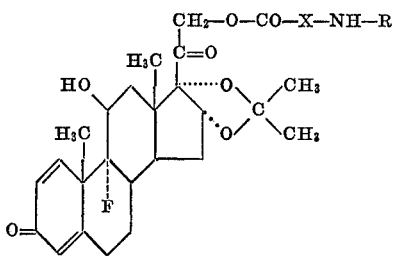

are prepared by a process wherein triamcinolone is reacted with an acyl chloride of the formula R—NH—X—COCl.

The invention concerns new triamcinolone acetonide esters of the general formula:

(I)

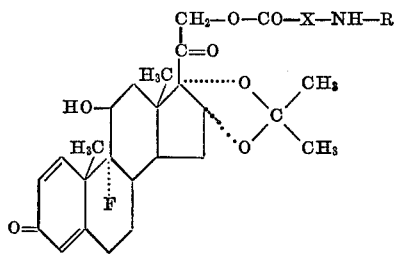

wherein R may be —CO—CH$_3$ or —CO—C$_6$H$_5$, whereas X represents a linear or branched alkylene radical having from 2 to 10 carbon atoms.

Furthermore the invention concerns a process for the preparation of said esters.

Carboxylic acids used for the preparation of esters according to the invention with triamcinolone acetonide are for example: β-acetaminopropionic acid, β-benzoylaminopropionic acid, β - benzoylaminoisobutyric acid, δ-acetaminovaleric acid, δ-benzoylaminovaleric acid, ε-acetaminocaproic acid, ε-benzoylaminocaproic acid, (7-acetamino)-heptanoic acid, (7-benzoylamino)-heptanoic acid, (8-acetamino)-octanoic acid, (8-benzoylamino)-octanoic acid.

These new triamcinolone acetonide esters of the above-indicated general formula are obtained by treating triamcinolone acetonide with the chlorides of the above-indicated acids.

The esterification is effected in the presence of an inert, dry organic solvent such as dioxane, tetrahydrofuran, N,N-dimethylformamide, operating at a temperature of from 10 to 50° C.

Furthermore the reaction is carried out in the presence of an acceptor of the hydrogen halide which forms; preferably pyridine was used, which may also act as a solvent.

The obtained products were studied as to their antiphlogistic properties on test animals in comparison with corticosteroid esters which latter are considered to be among the most active discovered till now. The products according to the present invention have shown to be very interesting.

It has been found that for example the esterification products of triamcinolone acetonide with ε-acetaminocaproic acid and β-benzoylaminoisobutyric acid have— the thymolytic and glucocorticoid effect being equal—in topical use an antiphlogistic action superior to that of triamcinolone and of betametazone valerate.

In the same way as these substances triamcinolone acetonide 21-(ε-acetamino)-caproate and 21-(β-benzoylamino)isobutyrate have no sodium-retaining action.

The following examples illustrate the synthesis process of the above-mentioned products.

EXAMPLE 1

Triamcinolone acetonide 21-(β-acetamino)propionate 262 mg. acetaminopropionic acid were suspended in 2 cc. anhydrous methylene chloride and then 476 mg. thionyl chloride were added. The mixture was stirred at room temperature for 20 hours. The methylene chloride was removed in vacuo and anhydrous benzene was added to the oily residue to remove in vacuo the thionyl chloride excess.

The so obtained oily residue was dissolved in 2 cc. N,N-dimethylformamide; this solution was added to a solution of 390 mg. triamcinolone acetonide dissolved in 2 cc. N,N-dimethylformamide and 1 cc. anhydrous pyridine.

The mixture was kept standing for 12 hours at room temperature. The obtained solution was poured in 200 cc. 1 N sulfuric acid under vigorous stirring.

The precipitate obtained was filtered, washed until disappearance of sulfate ions and dried in an oven at 40° C. in vacuo. The so obtained raw product was cold dissolved in methanol, decolorated with 10% active charcoal, the methanol was concentrated until appearance of the first crystals.

The obtained product was filtered, washed with little methanol and dried.

160 mg. of colourless product having M.P. 194–197° C. were obtained.

The product was recrystallized more than twice for the elementary analysis.

Calculated (percent): C, 63.60; H, 6.99; N, 2.55. Found (percent): C, 62.80; H, 6.75; N, 2.70.

EXAMPLE 2

Triamcinolone acetonide 21-(β-benzoylamino) propionate 500 mg. β-benzoylaminopropionic acid were suspended in 2 cc./anhydrous methylene chloride and 618 mg. thionyl chloride were added. The mixture was stirred at room temperature for 25 hours. The methylene chloride was removed in vacuo, to the residue was added anhydrous benzene to remove in vacuo the thionyl chloride excess. The solid obtained was dissolved in 2 cc. N,N-dimethylformamide; this solution was added to a solution of 434 mg. triamcinolone acetonide dissolved in 2 cc. N,N-dimethylformamide and 1 cc. anhydrous pyridine. The mixture was kept standing for 12 hours at room temperature. The solution was poured in 200 cc. 1 N sulfuric acid under stirring, filtered, washed until disappearance of the sulfate ions and dried in a vacuum oven.

The raw product obtained was dissolved in methanol, decolorated with 10% active charcoal, concentrated and crystallized. After filtration 300 mg. white product having M.P. 180–182° C. were obtained.

The product was crystallized two more times for the elementary analysis.

Calculated (percent): C, 66.9; H, 6.61; N, 2.2. Found (percent): C, 66.2; H, 6.31; N, 2.32.

EXAMPLE 3

Triamcinolone acetonide 21-(β-benzoylamino) isobutyrate 1.242 g. β-N-benzoylaminoisobutyric acid were suspended in 2 cc. anhydrous methylene chloride and then 1.420 g. thionyl chloride were added.

It was stirred at room temperature for 24 hours. The methylene chloride was removed in vacuo, to the residue was added anhydrous benzene to remove in vacuo the thionyl chloride excess.

The so obtained acid chloride was dissolved in 10 cc. N,N-dimethylformamide; this solution was added to a solution of 2.170 g. triamcinolone acetonide dissolved in 10 cc. N,N-dimethylformamide and in 4 cc. anhydrous pyridine.

The mixture was kept standing at room temperature for 4 hours, then it was poured dropwise, under vigorous stirring, in 1 N sulfuric acid.

The obtained precipitate was filtered, washed until disappearance of sulfate ions and dried in an oven at 40° C. in vacuo.

The so obtained raw product was crystallized from ethanol after decoloration with active charcoal.

2.750 g. ester having M.P. 203–207° C. were obtained. The product was crystallized two more times for the elementary analysis.

Calculated (percent): C, 67.45; H, 6.74; N, 2.23. Found (percent): C, 67.9; H, 6.92; N, 2.30.

EXAMPLE 4

Triamcinolone acetonide 21-(δ-acetamino)valerate

Prepared as described in Example 1 starting from 318 mg. acetaminovaleric acid, 476 mg. thionyl chloride and 347 mg. triamcinolone acetonide. 268 mg. ester having M.P. 194–197° C. were obtained.

It was crystallized for the analysis.

Calculated (percent): C, 64.7; H, 7.4; N, 2.4. Found (percent): C, 64.2; H, 7.26; N, 2.25.

EXAMPLE 5

Triamcinolone acetonide 21-(δ-benzoylamino)valerate

Prepared as described in Example 2 starting from 500 mg. benzoylamino valeric acid, 534 mg. thionyl chloride and 434 mg. triamcinolone acetonide.

360 mg. ester having M.P. 175–178° C. were obtained. It was crystallized for analysis.

Calculated (percent): C, 67.7; H, 6.9; N, 2.1. Found (percent): C, 68.0; H, 6.7; N, 2.03.

EXAMPLE 6

Triamcinolone acetonide 21-(ε-acetamino)-caproate

Prepared as described in Example 1 starting from 2 g. ε-acetaminocaproic acid, 2.730 g. thionyl chloride and 2.470 g. triamcinolone acetonide. 2.150 g. ester having M.P. 188–191° C. were obtained.

It was crystallized for analysis.

Calculated (percent): C, 65.1; H, 7.5; N, 2.3. Found (percent): C, 65.20; H, 7.54; N, 2.15.

EXAMPLE 7

Triamcinolone acetonide 21-(ε-benzoylamino)caproate

Prepared as described in Example 2 starting from 1.250 g. ε-benzoylamino caproic acid, 1.260 g. thionyl chloride and 1.150 g. triamcinolone acetonide.

1.1 g. ester having M.P. 235–237° C. were obtained. It was crystallized for analysis.

Calculated (percent): C, 68.1; H, 7.1; N, 2.1. Found (percent): C, 67.5; H, 7.41; N, 2.24.

EXAMPLE 8

Triamcinolone acetonide 21-(7-acetamino)heptanoate

Prepared as described in Example 1 starting from 370 mg. 7-acetylaminoheptanoic acid, 476 mg. thionyl chloride and 434 mg. triamcinolone acetonide.

300 mg. ester having M.P. 144–147° C. were obtained. It was crystallized for analysis.

Calculated (percent): C, 65.64; H, 7.68; N, 2.32. Found (percent): C, 65.41; H, 7.82; N, 2.15.

EXAMPLE 9

Triamcinolone acetonide 21-(7-benzoylamino)-heptanoate

Prepared as described in Example 2 starting from 500 mg. 7-benzoylaminoheptanoic acid, 476 mg. thionyl chloride and 434 mg. triamcinolone acetonide.

440 mg. ester having M.P. 200–202° C. were obtained. It was crystallized for the analysis.

Calculated (percent): C, 68.5; H, 7.2; N, 2.1. Found (percent): C, 68.4; H, 6.99; N, 2.13.

EXAMPLE 10

Triamcinolone acetonide 21-(8-acetamino)octanoate

Prepared as described in Example 1 starting from 402 mg. 8-acetylaminooctanoic acid; thionyl chloride 476 mg., and 434 mg. triamcinolone acetonide.

350 mg. ester were obtained having M.P. 134–136° C. It was crystallized for the analysis.

Calculated (percent): C, 66.1; H, 7.8; N, 2.2. Found (percent): C, 66.4; H, 7.71; N, 2.25.

EXAMPLE 11

Triamcinolone acetonide 21-(8-benzoylamino) octanoate

Prepared as described in Example 2 starting from 526 mg. 8-benzoylaminooctanoic acid, 476 mg. thionyl chloride and 434 mg. triamcinolone acetonide.

420 mg. ester having M.P. 215–218° C. were obtained. It was crystallized for the analysis.

Calculated (percent): C, 68.9; H, 7.4; N, 2.0. Found (percent): C, 68.6; H, 7.21; N, 1.96.

We claim:

1. A compound of the formula

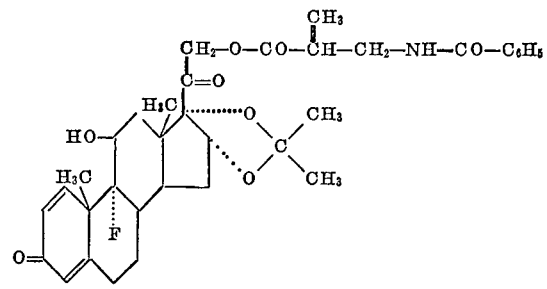

References Cited

UNITED STATES PATENTS

| | | | |
|---|---|---|---|
| 2,885,413 | 5/1959 | Hogg et al. | 260—397.45 |
| 3,073,743 | 1/1963 | Spero | 167—65 |
| 3,314,854 | 4/1967 | Heider et al. | 167—65 |
| 3,374,230 | 3/1968 | Gardner et al. | 260—239.55 |
| 3,549,498 | 12/1970 | Diassi et al. | 195—51 |

HENRY A. FRENCH, Primary Examiner

U.S. Cl. X.R.

260—999